FROST & MONROE.
Separating Flour from Bran.
No. 555.
Reissued May 11, 1858.
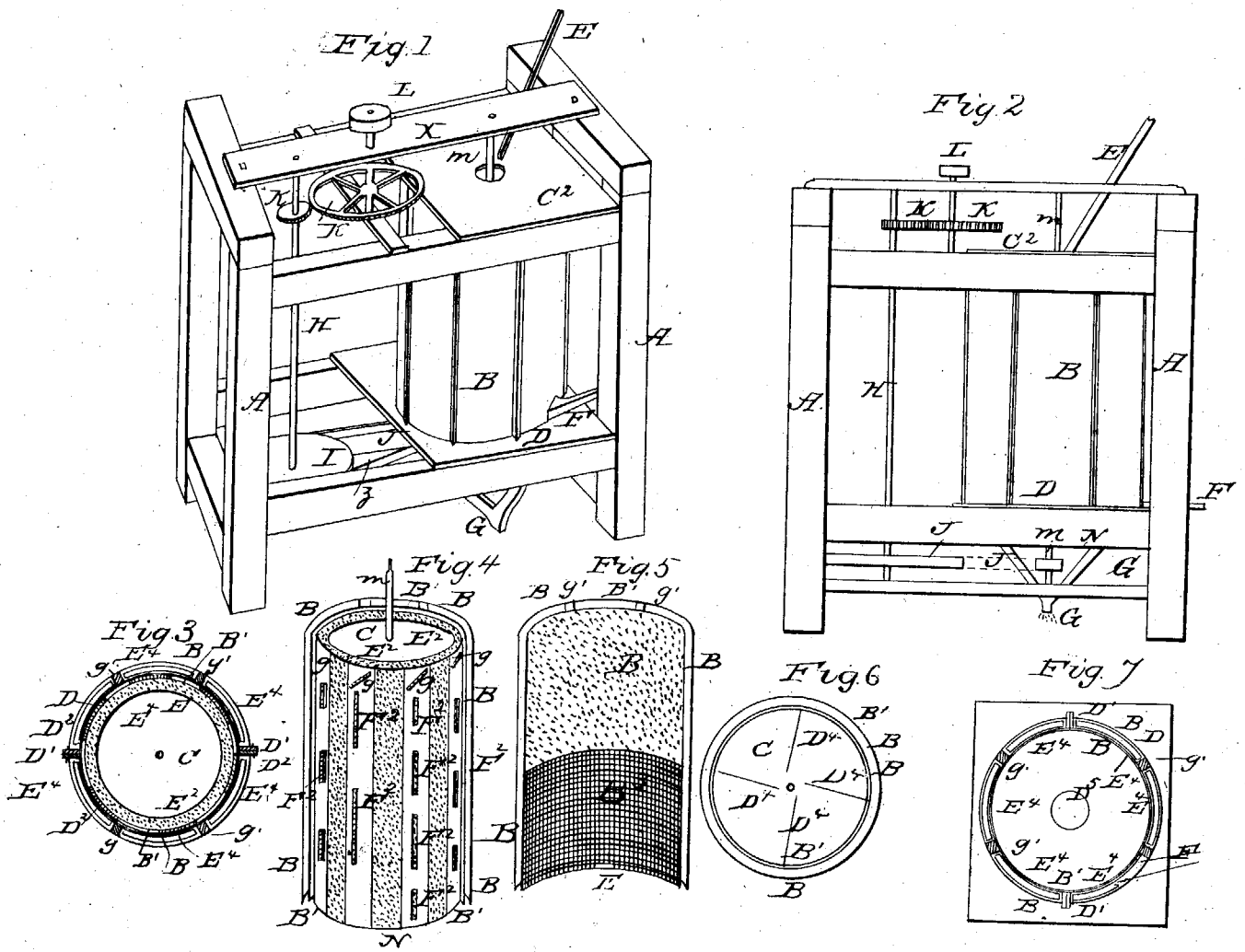
N. PETERS, Photo-Lithographer, Washington, D. C.

UNITED STATES PATENT OFFICE.

ISSACHAR FROST AND JAMES MONROE, OF NEW YORK, N. Y., ASSIGNORS TO H. A. BURR, I. D. CONDIT, A. SWIFT, D. BARNUM, AND J. M. CARR.

IMPROVEMENT IN MACHINERY FOR SEPARATING FLOUR FROM BRAN.

Specification forming part of Letters Patent No. 6,148, dated February 27, 1849; Reissue No. 302, dated March 13, 1855; Reissue No. 555, dated May 11, 1858.

*To all whom it may concern:*

Be it known that we, ISSACHAR FROST and JAMES MONROE, of Albion, in the county of Calhoun and State of Michigan, did invent a new and useful Improvement in the Machine for Separating Flour from Bran, Shorts, and Ship-Stuff, for which Letters Patent of the United States were granted unto us bearing date the 27th day of February, 1849, which said Letters Patent were surrendered on account of a defective and insufficient specification, and thereupon new Letters Patent were granted, bearing date the 13th day of March, 1855, for the same invention, for the residue of the period then unexpired for which the original Letters Patent were granted; that the said reissued patent so granted on the 13th day of March, 1855, is believed to be inoperative by reason of an insufficient description and specification, and that the following is a full, clear, and exact description and specification of the principle or character which distinguishes the said invention from all other things before known, and of the manner of making, constructing, and using the same, reference being had to the accompanying drawings, making part thereof, in which—

Figure 1 is a perspective view; Fig. 2, an elevation; Fig. 3, a view of the upper end of the cylinder and bolt; Fig. 4, a perspective view of the cylinder with part of the surrounding bolt and case; Fig. 5, a view of the inside of the bolt and part of the surrounding case; Fig. 6, a view of the lower end of the cylinder with the wings or arms, and Fig. 7 a top view of the platform with the other parts of the machine removed.

It is well known that in the process of grinding wheat the kernel is reduced to a fine powder and the thin hull is broken up into thin flakes, which flakes will not pass through the meshes of a sieve through which the particles of flour will pass freely. By reason of this difference in size between the particles of flour and flakes of the hull, called "bran," the two can be separated by the process of sifting, usually termed "bolting," but much of the flour so adheres to the flakes of bran that it cannot be separated by the usual process of bolting, and, in consequence, a large percentage of flour is wasted, or rather is left as part of the bran. This waste has long been recognized, and prior to our invention some attempts were made to contrive machinery to effect the separation of it from the bran, but, so far as we are informed, without practical and economical results.

In the usual mode of bolting practiced in mills the flour is not and cannot be fully separated from the bran, and, in consequence, the offal, usually termed "shorts," is composed of bran and flour. The leading object of our said invention is to separate and save the flour which adheres to the bran when it is discharged from the ordinary bolt, although our said invention may be employed to separate the flour directly from the bran without first passing it through the usual bolt, but in either case the thing to be accomplished is to separate the flour which adheres to the surface of the bran, as the usual bolting operation simply separates the free flour—that is, the flour which does not adhere to the bran.

The mode of operation of the prior machines known to have been essayed for this purpose was to effect the separation by brushing the material against the inner surface of a bolt by rotating brushes, and thereby brush the particles of flour from the bran, and force them through the meshes of a surrounding cylindrical bolt or sieve, which meshes, although of sufficient size for the passage of the particles of flour, would not permit the flakes of bran to pass through. This mode of operation is objectionable, for the reason that the triturating operation, if effectual to rub the flour from the bran, will break the flakes of bran into minute particles, and force portions of them through the meshes of the bolt with the flour, and thereby injuring its quality instead of effecting the required separation; and, again, the cylindrical bolt being placed in a horizontal position, all, or nearly all, the material, by the force of gravity, would accumulate on the lower part, thus rendering inefficient all but a small section of the bolt at any one time.

Another plan was suggested with the view to render efficient the whole of the sifting-surface of the cylindrical bolt, which was sought to be effected by placing the cylindrical bolt and the rotating brushes in a vertical position, and although the position of the bolt has since been found to be essential to an efficient machine for the purpose in question, as the machine was organized it could not be practically efficient, for the want of a suitable organization to act upon and control the material to be separated. When the bolt is in a horizontal position, the force of gravity alone will carry the material to be separated in contact with a portion of the sifting-surface of the bolt, but when placed in a vertical position the force of gravity tends to carry the material directly through the bolt and out at the bottom without coming in contact with the surface of the bolt, and hence this new position of the bolt demands the introduction of some mode of operation which will distribute the material and impel it outward against the entire circumference of the bolt, and so control and check its passage through the length of the bolt that all the flour may be separated from the bran and forced through the meshes of the bolt before the bran reaches the bottom, where it is discharged; and in these respects the said machine so suggested before our invention was so defective as to be of no practical value.

We were soon taught by reason and experience that a different mode of operation was necessary to success. In the first place, to render the whole surface of the bolt practically efficient in the separation, it was necessary to adopt the plan of placing it with its axis in a vertical position, and that it was necessary, in combination with this, to employ some mechanical action to scatter the material when introduced and to carry it toward and against the entire inner circumference of the upper end of the bolt, and, when so thrown outward, to prevent it from being blown or thrown out of the upper or feeding end, and when fairly within the bolt to reduce, or check, as it were, the action of the force of gravity on the material to prevent it from being carried to the bottom before separation could be effected, otherwise it would fall directly to and out at the bottom unseparated; and it was also necessary, in view of the high velocity required, to provide against the production of improper currents of air, such as might destroy the efficient action on the material, and, after thus checking the descent, it was necessary that the material so carried toward the circumference and checked in the descent should be acted upon to loosen the particles of flour from the bran, and to carry the particles of flour through the meshes of the bolt while the separated bran was gradually descending to the bottom to be discharged.

In view of the mode of operation or the several actions required to effect the purpose contemplated, our invention consists in placing the bolt in a vertical position, or nearly so, in connection or combination with the following essential features, or some of them: First, a case, or its equivalent, surrounding the bolt, and forming a chamber or chambers to receive the flour as it is forced through the meshes of the bolt, the said chamber being provided with a suitable aperture or apertures at bottom for the delivery of the flour as it is collected, and which, if not permitted so to escape, would soon accumulate and stop up the meshes of the bolt; second, the closing up of the top of the said bolt, except an aperture or apertures for the admission or feeding in of the material with air, the said aperture being placed somewhere within the periphery of the bolt, and the nearer the center the better, so that the material, when introduced, may be properly acted upon and distributed as it is carried toward the inner surface of the bolt, to be forced outward toward the periphery of the bolt, and to prevent it from being thrown out of the machine at the upper end; third, the closing up of the bottom of the bolt proper, except an aperture or apertures near the periphery for the discharge of the bran after the flour has been separated, whether the said bottom be or be not provided especially with an aperture for the admission of air, the purpose of so closing up the bottom being the better to prevent the escape of the material in downward currents of air, and thus the better to check the descent of the material through the bolt, that it may be retained within the bolt a sufficient length of time to effect the separation of the flour from the bran and the discharge of the flour through the meshes of the bolt, which could not be so well accomplished if the bottom was open, for the reasons already stated; fourth, a rotating distributing-table, within and near the upper end of the bolt, onto which the material falls when fed into the machine, for the purpose of scattering and distributing it, and by centrifugal force impelling it toward the inner circumference of the bolt, so as to have it descend in an annular space just within the periphery of the bolt, instead of descending through the middle of the bolt, that the beating and separating action may take effect when the mechanical action is at its maximum and in close proximity with the bolting-surface, that the flour, as soon as liberated from the bran, may be driven through the meshes of the bolt, which could not be accomplished if the material were permitted to pass down the middle of the bolt; fifth, rotating beaters, pins, fans, or analogous means, which, in rotation, will beat the material as it is descending in the annular space near the bolt, and by centrifugal action generate an outward current of air, each of which, and both jointly, will act to effect the separation of the flour from the bran and the discharge of the flour through the meshes of the bolt; and, sixth, rotating arms or wings moving in close proximity with the upper surface of the platform or bottom of the bolt, to act on the bran which falls on the said bottom and carry it to the discharge aperture or apertures, where it is delivered, and which, if not so operated upon, would pile up on the closed-up bottom and soon choke the operation of the machine.

The frame A A should be made about two and a half feet wide by four feet long inside, and about four feet (more or less) high, and of timber four inches square. B represents a cylindrical case, made of sheet-iron or of other material, supported on the inside by the outside edge of the annular ribs that support the cloth on their inside, made some two or three inches wide and from half an inch to one inch thick, said case to be twenty-two inches in diameter and thirty-two inches high, inclosed in which, and supported by and attached to the ribs on the inside of the case, is a cylindrical bolt, made of wire bolting-cloth, $B^3$, and perforated sheet iron, B′, eighteen inches in diameter and thirty-two inches high, also inclosed within said case and within the bolt, and twenty-nine inches long, and attached to and driven by the shaft M.

At $C^2$ is represented a cover or top to the case B, through the center of which is a hole four inches in diameter, rising through which is the shaft M.

At D is shown the platform on which rests the case and bolts, and through the center of which is to be an opening, $D^5$, similar to that in the top $C^2$, through which may pass the shaft M; also, for the free admission of air. (More fully shown at Fig. 7.)

At E is shown a conductor, used to convey ground material through the top to the inner portion of the cylinder, for bolting or cleaning.

At F is shown a conductor, through which is discharged the bran, &c., after cleaning.

At G is shown conductors to convey off the flour, the upper ends of which are connected with the bottom of the bolt or platform, or space E, or openings in the bottom or platform D, between the bolt and case.

At H, I, J, K, and L, respectively, are shown a shaft, pulley, band, pinion spur wheel, and driving-pulley, used to drive the cylinder the required velocity, the band J passing from the pulley I and around the pulley N, attached to the lower end of shaft M M, as shown at Fig. 2.

Fig. 2, at A A, represents a side view of the frame B, the case surrounding the bolt, cylinder, &c.; $C^2$, top of case; D, platform or horizontal bottom; E, conductor to feed the machine; F, conductor for bran after cleaning; G G, flour-conductor; K, speed-shaft; I, large pulley; J, band; K K, pinion and spur-wheel; L, driving-pulley; M M, cylinder-shaft; N, pulley.

Fig. 3 shows the top of the cylinder bolt and case, with the top $C^2$, Fig. 1, removed. B shows the edge of case; B′, the edge of bolt; C, the upper end of cylinder; D′ D′, Fig. 7, an extension of ribs upon the outside of the case to admit of bolts to fasten the case (which is made in section) together.

Fig. 4 shows, in perspective, the cylinder, made of wood and iron, and parts of the one-half of the case and bolt; B B, the case; B′ B′ B′, the bolt; C, the cylinder at $D^2$ $D^2$ $D^2$ $D^2$. On the cylinder is represented sections or strips of teeth projecting outward about three-fourths of an inch from the surface. The teeth may be made of brads or small nails, with the heads removed and driven in, or may be made by driving large tacks through strips of leather at intervals of one-fourth of an inch, (more or less,) and nailing the strips of leather on the cylinder, with the points of the tacks projecting. The sections of teeth should cover about one-half of the surface of the cylinder.

$E^2$ is a similar strip to those at $D^2$, constructed in the same manner, and nailed on the upper end and around the outer edge, with the teeth projecting upward. It may be from two to four inches wide, which is intended for distributing the material more perfectly and evenly around the bolting surface.

At $F^2$ $F^2$, and upon the cylinder, is shown strips or wings of sheet-iron or other material, fastened to the cylinder, with one edge (or both) turned at right angles with the surface of the cylinder, so as to form wings or fans. They may be put at regular or irregular intervals, so as to balance the cylinder. The upper wings, as at G, may be put on spirally. The wings may project about as far as the ends of the teeth.

At Fig. 5 is shown sections of the bolt and case; B B, edges of the case; B′ B′, the upper part of the bolt, made of sheet-iron, thickly perforated with small holes by indentation by a sharp pointed punch, and put on with the rough side next to the cylinder, so as the more effectually to scour the bran, &c.; $B^3$, the lower portion of the bolt, made of fine-wire bolting-cloth. At $E^3$ is shown openings leading into conductor F, Figs. 5, 2, and 7.

The bolt may be made in the manner described, or the entire bolt may be made of either substance described above, or any other like substance which will cause the same results.

At Fig. 6 is shown the lower end of cylinder, case, and bolt; B, case; B′, the bolt; C, the cylinder. $D^4$ $D^4$ $D^4$ $D^4$ are wings projecting downward from the ends of the cylinder, about one and a half or three-fourths inches, in a space of two inches between cylinder and horizontal bottom, for the purpose of collecting the bran after the flour has been separated from it and it has fallen on the bottom, and carry it around to the discharge, and thus prevent the machine from being choked up by the accumulation of the said bran. The balance of the space is occupied with a cleat on the back edge of bran-spout, to arrest the bran brought round by the wings immediately to the bran-exit. The arrangement of the wings is such as to induce a supply of air from $D^5$ to counteract the too rapid fall of the material by the air admitted at the top.

D, Fig. 7, shows the platform or horizontal bottom at right angles with the axis of the bolt; G G, ribs for dividing the annular space between the case and the bolt into spaces or sections; $D^5$, a hole for the admission of air, and through which the shaft of the cylinder is to pass.

$E^4$ $E^4$ are the segmental spaces or openings in the bottom D, between the bolt and case. These spaces may be segmental mortices, cut through the platform, for the escape of the flour, as shown.

F is the conductor for the bran, shown in connection with the bottom, or it may be partly through the side of the bolt and bottom, or wholly through the bottom.

The above-described machine when put in motion (about eight hundred revolutions per minute) will (if constructed as above) scour and separate from bran, shorts, &c., all the remaining particles of flour which may adhere after the first bolting, or may be used as a first bolter by spouting the material direct from the stones into it, which in that case will bolt and fan the flour cool the instant it is ground, preventing the condensation of the atmosphere upon the heated material occasioned by the rapid grinding we do of late years. After the machine is put in motion the material should be fed in through the conductor E, Fig. 1; thence, falling upon the distributing head or table, is carried by the centrifugal action over the end and down the sides between the cylinder and bolt, where it is distributed, beaten, and scoured, so as to remove all remains of flour, the bran continuing in its course (not being permitted to escape through the fine bolting-cloth) downward, where it is carried round by rotating wings or arms to the conductor or bran-spout F, Figs. 7, 2, and 1, while the flour passes through the bolt into the annular spaces between the bolt and case, thence passes downward into the conductor G, Fig. 1, thence into the flour-chest, (or the cooler of the mill.)

The perforated portion of the bolt at B may be covered on the convex surface with bolting-cloth to prevent the escape of the flour. The vertical parallel strips of iron H on the cylinder C may be made rough by punching for the scouring of the bran.

If desired, knockers may be applied, as in the ordinary bolt, to jar the machine and prevent choking; but this will only be required when the speed of the cylinder is not sufficient and the flour is damp and liable to adhere; but as the use of knockers is well known and have been variously applied to bolting-machines, it is not deemed necessary to give a detailed description of their application.

We do not claim as our invention the placing of the bolt in a vertical position, as this was known before our said invention, but under a combination of parts resulting in a mode of operation essentially different from our said invention; nor do we claim any of the separate parts or subcombinations other than as hereinafter specified.

What we do claim as our invention, and desire to secure by Letters Patent, is the combination of the following essential features, or their equivalents, viz:

1. The vertical or nearly vertical position of the bolt.

2. A surrounding case forming a chamber or chambers around the bolt, substantially as and for the purpose specified, and provided with suitable means for the delivery of the flour, as specified.

3. A rotating distributing-head at or near the upper end of the bolt, substantially as described.

4. Rotating beaters or fans within the bolt, substantially as and for the purpose specified.

5. In combination with the first, second, and fourth features of the combination first claimed, the closed-up top of the bolt, except an aperture or apertures for the admission of the material and air, substantially as and for the purpose specified.

6. In combination with the first, second, and fourth features of the combination first claimed, the closed-up bottom of the bolt proper, except an aperture or apertures for the discharge of the bran, substantially as and for the purpose specified, whether the said bottom be or be not specially provided with an aperture or apertures for the admission of air, as specified.

7. In combination with the third combination claimed, or the equivalent of the features thereof, the employment of rotating arms or wings moving in close proximity with the inner surface of the closed-up bottom, substantially as and for the purpose specified.

8. The combination of all the features herein specified as essential features, substantially as described, or any equivalents for any or all the said features.

ISSACHAR FROST. [L. S.]

Witnesses to the signature of said Frost:
HENRY B. FROST,
JAMES ATKINSON.

JAMES MONROE. [L. S.]

Witnesses to the signature of said Monroe:
WILLIAM HOWARD,
A. MOREHEAD.